(12) United States Patent
Assouline et al.

(10) Patent No.: US 12,682,508 B2
(45) Date of Patent: Jul. 14, 2026

(54) N-FLOWS ESTIMATION FOR GARMENT TRANSFER

(71) Applicant: Snap Inc., Santa Monica, CA (US)

(72) Inventors: Avihay Assouline, Tel Aviv (IL); Amir Fruchtman, Holon (IL); Riza Alp Guler, London (GB); Jonathan Heimann, Herzliya (IL); Nir Malbin, Shoham (IL)

(73) Assignee: SNAP INC., Santa Monica, CA (US)

( * ) Notice: Subject to any disclaimer, the term of this patent is extended or adjusted under 35 U.S.C. 154(b) by 237 days.

(21) Appl. No.: 18/425,960

(22) Filed: Jan. 29, 2024

(65) Prior Publication Data

US 2025/0245865 A1     Jul. 31, 2025

(51) Int. Cl.
*G06T 11/00*          (2026.01)
*G06T 3/40*           (2024.01)
(Continued)

(52) U.S. Cl.
CPC ................ *G06T 11/00* (2013.01); *G06T 3/40* (2013.01); *G06T 7/248* (2017.01); *G06T 7/73* (2017.01);
(Continued)

(58) Field of Classification Search
CPC . G06T 11/00; G06T 3/40; G06T 7/248; G06T 7/73
See application file for complete search history.

(56) References Cited

U.S. PATENT DOCUMENTS 5,604,843 A     2/1997  Shaw et al.
5,689,559 A     11/1997  Park
(Continued)

FOREIGN PATENT DOCUMENTS

CN     109863532     6/2019
CN     110168478     8/2019
(Continued)

OTHER PUBLICATIONS

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers> (captured Feb. 25, 2021), 3 pgs.
(Continued)

*Primary Examiner* — Matthew Salvucci
(74) *Attorney, Agent, or Firm* — SCHWEGMAN LUNDBERG & WOESSNER, P.A.

(57) ABSTRACT

Methods and systems are disclosed for using machine learning models to perform pixel-based deformation of fashion items using N-flows estimation. The methods and systems receive one or more images depicting a first person in a first pose and receive a source image depicting a target fashion item worn on a portion of a body of a second person in a second pose, the target fashion item comprising a plurality of parts. The methods and systems process, using one or more machine learning models, the one or more images together with the source image to generate a set of data comprising a plurality of flow fields each associated with a different one of the plurality of parts of the target fashion item. The methods and systems modify a portion of the one or more images to overlay the target fashion item on the first person in the first pose.

20 Claims, 10 Drawing Sheets

(51) Int. Cl.
　　*G06T 7/246*　　　(2017.01)
　　*G06T 7/73*　　　　(2017.01)
(52) U.S. Cl.
　　CPC ............... *G06T 2207/20081* (2013.01); *G06T 2207/20084* (2013.01); *G06T 2207/20221* (2013.01); *G06T 2207/30196* (2013.01); *G06T 2210/16* (2013.01); *G06T 2210/36* (2013.01)

(56)　　　　　　References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| RE43,993 | E | 2/2013 | Park |
| 8,384,719 | B2 | 2/2013 | Reville et al. |
| RE44,054 | E | 3/2013 | Kim |
| RE44,068 | E | 3/2013 | Park |
| RE44,106 | E | 3/2013 | Park |
| 8,396,708 | B2 | 3/2013 | Park et al. |
| RE44,121 | E | 4/2013 | Park |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | Andres del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,532,364 | B2 | 12/2016 | Fujito |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,656,797 | B1 | 5/2020 | Alvi et al. |
| 10,657,695 | B2 | 5/2020 | Chand et al. |
| 10,657,701 | B2 | 5/2020 | Osman et al. |
| 10,762,174 | B2 | 9/2020 | Denton et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |

(56)                 References Cited

U.S. PATENT DOCUMENTS

| | | | |
|---|---|---|---|
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2015/0206349 A1 | 7/2015 | Rosenthal et al. | |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0188920 A1 | 6/2019 | Mcphee et al. | |
| 2019/0280997 A1 | 9/2019 | Baldwin et al. | |
| 2020/0306637 A1 | 10/2020 | Baldwin et al. | |
| 2020/0372127 A1 | 11/2020 | Denton et al. | |
| 2020/0410575 A1 | 12/2020 | Grantham et al. | |
| 2021/0065418 A1* | 3/2021 | Han | G06T 11/60 |
| 2021/0074047 A1 | 3/2021 | Sheth et al. | |
| 2021/0089179 A1 | 3/2021 | Grantham et al. | |
| 2021/0104087 A1 | 4/2021 | Smith et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1 | 7/2021 | Chand et al. | |
| 2021/0240315 A1 | 8/2021 | Alvi et al. | |
| 2021/0243482 A1 | 8/2021 | Baril et al. | |
| 2021/0243503 A1 | 8/2021 | Kotsopoulos et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |
| 2025/0005824 A1* | 1/2025 | Jain | G06T 11/001 |

FOREIGN PATENT DOCUMENTS

| | | |
|---|---|---|
| CN | 113538610 | 10/2021 |
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"Bitmoji Chrome Extension", [Online] Retrieved from the Internet: <URL: https://web.archive.org/web/20200919024925/https://support. bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support. snapchat.com/en-US/a/bitmoji>, (captured May 3, 2019), 2 pgs.

"Manage Your Bitmoji", Snapchat Support, [Online] Retrieved from the Internet: <URL: https://web.archive.org/web/20190503063620/ https://support.snapchat.com/en-US/a/manage-bitmoji>, (captured May 3, 2019), 3 pgs.

"Bitmoji Family", Snapchat Support, [Online] Retrieved from the Internet: <URL: https://web.archive.org/web/20190503063620/ https://support.snapchat.com/en-US/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/ http://bitmoji.com/>, (captured Feb. 5, 2015), 3 pgs.

"Instant Comics Starring You and Your Friends", Bitstrips Inc, [Online] Retrieved from the Internet: <URL: https://web.archive. org/web/20150206000940/http://company.bitstrips.com/bitstrips-app. html>, (captured Feb. 6, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers- personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/ bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

(56)     References Cited

OTHER PUBLICATIONS

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles- and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.

"International Application Serial No. PCT/US2025/013449, International Search Report mailed Apr. 30, 2025", 3 pgs.

"International Application Serial No. PCT/US2025/013449, Written Opinion mailed Apr. 30, 2025", 8 pgs.

Xie, Zhenyu, "GP-VTON: Towards General Purpose Virtual Try-on via Collaborative Local-Flow Global-Parsing Learning", IEEE CVF Conference on Computer Vision and Pattern Recognition (CVPR), IEEE, (Jun. 17, 2023), 23550-23559.

* cited by examiner 104     124     100

Figure 2:
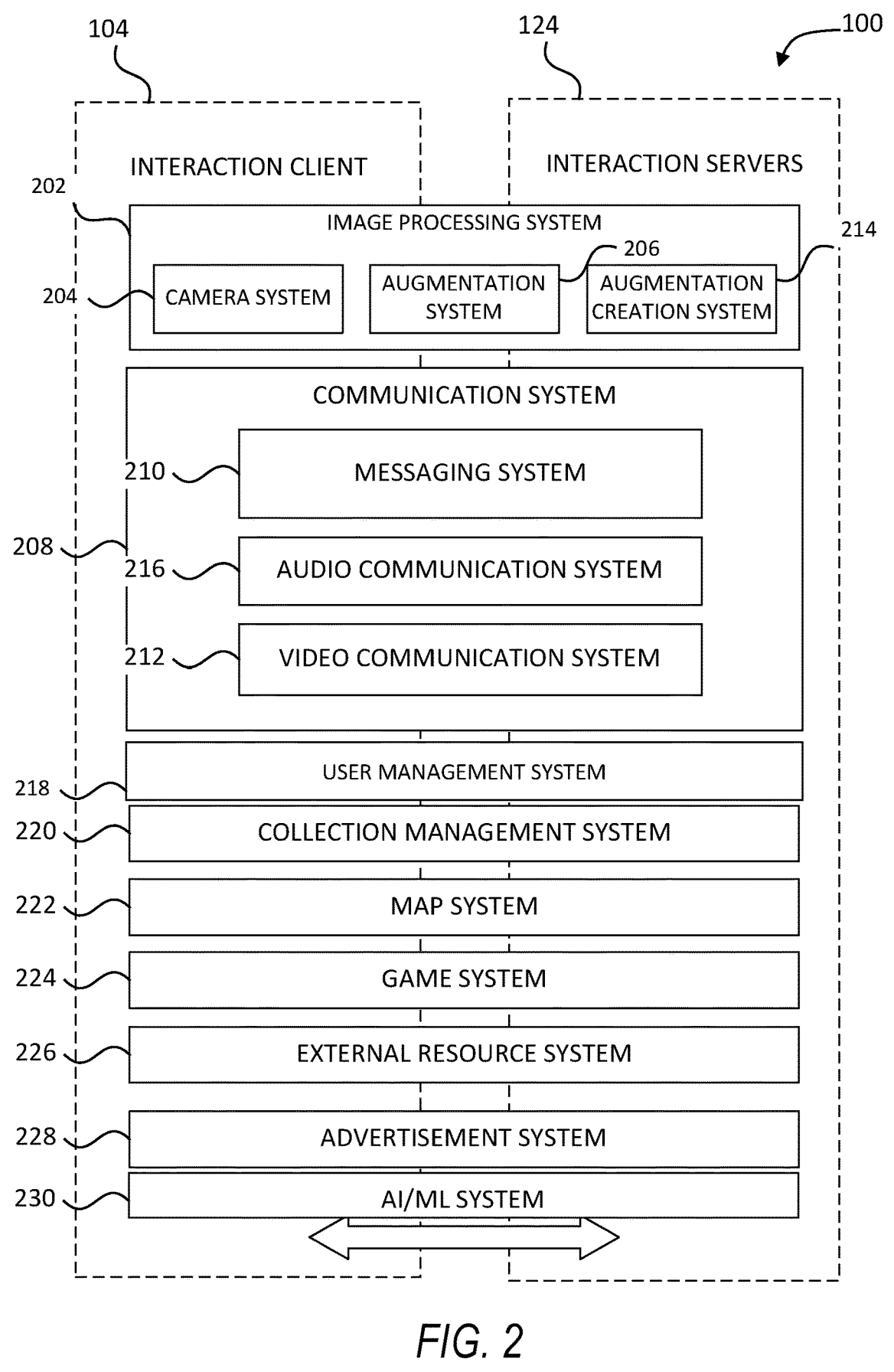

INTERACTION CLIENT     INTERACTION SERVERS

202

IMAGE PROCESSING SYSTEM     214

206

204     CAMERA SYSTEM     AUGMENTATION SYSTEM     AUGMENTATION CREATION SYSTEM

COMMUNICATION SYSTEM

210     MESSAGING SYSTEM

208

216     AUDIO COMMUNICATION SYSTEM

212     VIDEO COMMUNICATION SYSTEM

218     USER MANAGEMENT SYSTEM

220     COLLECTION MANAGEMENT SYSTEM

222     MAP SYSTEM

224     GAME SYSTEM

226     EXTERNAL RESOURCE SYSTEM

228     ADVERTISEMENT SYSTEM

230     AI/ML SYSTEM

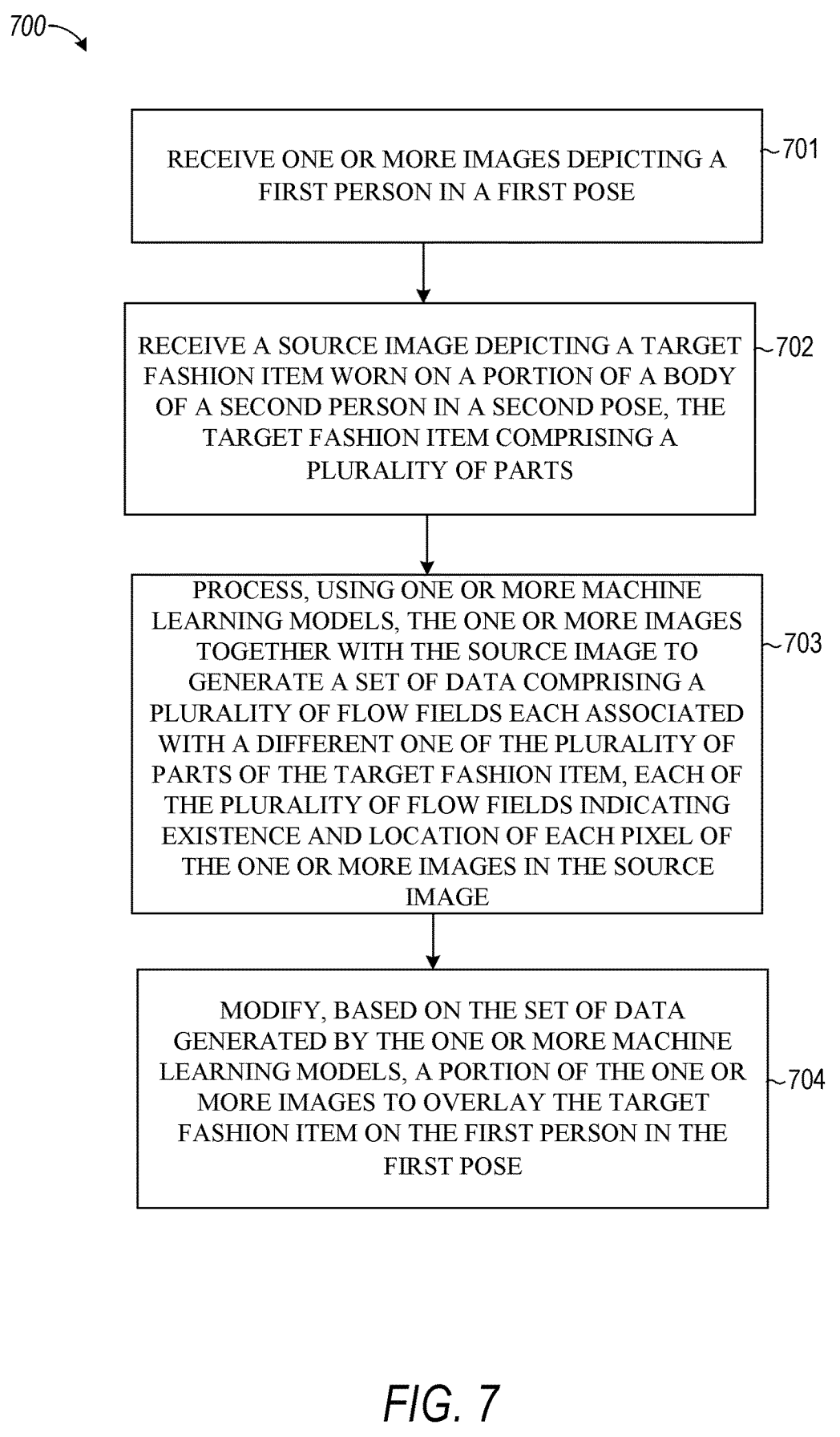

RECEIVE ONE OR MORE IMAGES DEPICTING A FIRST PERSON IN A FIRST POSE ~701

RECEIVE A SOURCE IMAGE DEPICTING A TARGET FASHION ITEM WORN ON A PORTION OF A BODY OF A SECOND PERSON IN A SECOND POSE, THE TARGET FASHION ITEM COMPRISING A PLURALITY OF PARTS ~702

PROCESS, USING ONE OR MORE MACHINE LEARNING MODELS, THE ONE OR MORE IMAGES TOGETHER WITH THE SOURCE IMAGE TO GENERATE A SET OF DATA COMPRISING A PLURALITY OF FLOW FIELDS EACH ASSOCIATED WITH A DIFFERENT ONE OF THE PLURALITY OF PARTS OF THE TARGET FASHION ITEM, EACH OF THE PLURALITY OF FLOW FIELDS INDICATING EXISTENCE AND LOCATION OF EACH PIXEL OF THE ONE OR MORE IMAGES IN THE SOURCE IMAGE ~703

MODIFY, BASED ON THE SET OF DATA GENERATED BY THE ONE OR MORE MACHINE LEARNING MODELS, A PORTION OF THE ONE OR MORE IMAGES TO OVERLAY THE TARGET FASHION ITEM ON THE FIRST PERSON IN THE FIRST POSE ~704

FIG. 7

N-FLOWS ESTIMATION FOR GARMENT TRANSFER

TECHNICAL FIELD

The present disclosure relates generally to processing images and videos using machine learning (ML) models, such as for performing augmented reality (AR) operations.

BACKGROUND

AR is a virtual modification of a real environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like. In general, AR and VR systems are referred to as extended reality (XR) systems.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system that has both client-side and server-side functionality, according to some examples.

FIG. 7 is a flowchart illustrating example operations and methods of the pixel-based deformation system, according to some examples.

DETAILED DESCRIPTION

Figure 1:
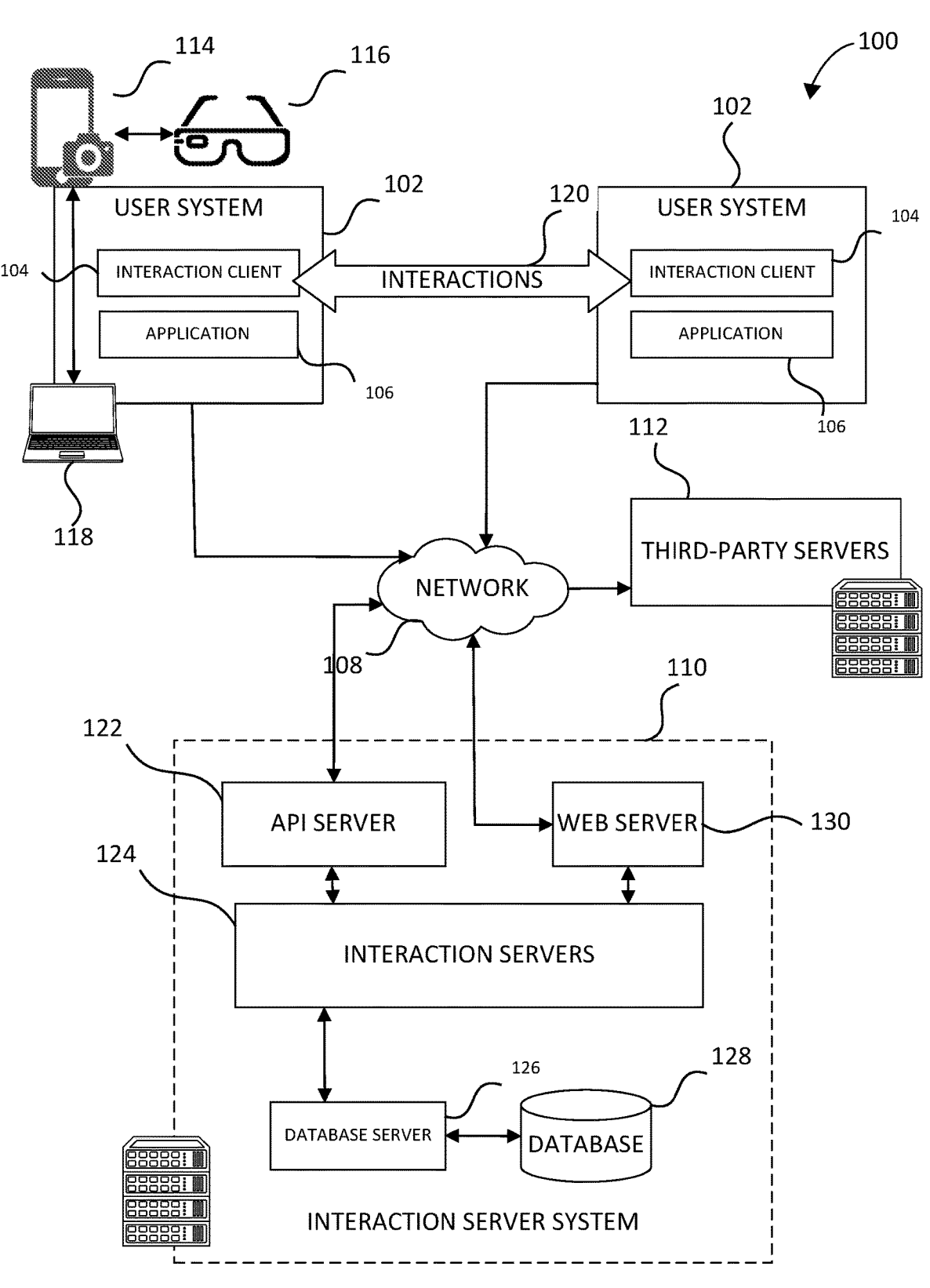
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, communication platforms allow users to share content and create images for transmission to other users. These images can be used to promote products or services and/or to simply represent different real-world objects in simulated or real environments. However, these systems require a user to use expensive equipment and technology to create high-quality, appealing images. Also, users may spend a great deal of effort meticulously placing objects in different environments and manually adjusting lighting and other image attributes to enhance the presentation of the objects in the images. All of these factors can add up to make the creation of high-quality images (e.g., for use in advertising) a significant expense and detract from the overall use and enjoyment of the system. In addition, because users may not have the resources needed to create high-quality images, opportunities to share and present objects in ideal settings are missed. Also, presenting lower quality images of such objects can cause other users to overlook the value of the objects, which wastes the resources used to create and display the objects.

In some cases, machine learning models are applied to generate XR experiences in which the above images/videos are created and shared. For example, the machine learning models can receive an image, such as from a camera, and can also receive an image depicting a target fashion item. The machine learning models can be trained to generate a new image in which the image depicting a person wearing one fashion item is modified to have the person wearing the target fashion item. These machine learning models, though, are usually limited in their capabilities and can end up generating new images that look unrealistic. Specifically, the machine learning models are usually limited to tracking fashion item portions that are attached to and to overlay the body parts of the users and fail to consider portions of the fashion items that may extend beyond the body parts. For example, a jacket with a hoodie can be processed using these machine learning models and can result in modifying a received image by overlaying only portions of the jacket that overlap body parts (e.g., the arms and torso) but can exclude the hoodie part of the jacket. As a result, the new image can include certain details that are unrealistic, blurry, and include artifacts. This can result in unrealistic presentations of the XR elements, which takes away from the illusion that the XR elements are actually part of a real-world environment depicted in the original image or video. This results in an unrealistic display of content, loss of interest by users in using these systems, and waste of resources used in the process of performing the computerized predictions.

The disclosed techniques seek to improve the efficiency of using an electronic device by improving predictions machine learning models generate based on input images. The disclosed techniques receive one or more images depicting a first person in a first pose and receive a source image depicting a target fashion item worn on a portion of a body of a second person in a second pose, the target fashion item comprising a plurality of parts. The disclosed techniques process, using one or more machine learning models, the one or more images together with the source image to generate a set of data comprising a plurality of flow fields each associated with a different one of the plurality of parts of the target fashion item. The disclosed techniques modify a portion of the one or more images to overlay the target fashion item on the first person in the first pose. This can reduce the overall time and expense incurred to develop high-quality images and/or videos, such as to provide XR experiences.

In some cases, as used herein, a "flow field" refers to a vector field that represents the distribution of velocities and directions of movement across a spatial domain. In the context of image processing and computer vision, a flow field typically maps the motion or transformation of pixels or features from one image to another, indicating how each point in one image moves to correspond with points in another image. This can be used to estimate the motion of objects, surfaces, or patterns between different frames or views. Some examples include optical flow in video processing. In such cases, a flow field can be used to describe the optical flow, which is the pattern of apparent motion of objects between consecutive frames caused by the movement of the object or camera. It is often used in motion detection, video compression, and video stabilization. In the context of human pose estimation, a flow field might be used to map the pixels of a person's image to a 3D model, indicating how each pixel corresponds to a point on the model's surface, allowing for the overlay of virtual clothing or accessories. In fluid dynamics, a flow field represents the velocity vectors of fluid particles in a simulation, showing how the fluid moves and changes over time within a given space. In aerodynamics, a flow field can describe the behavior of air around objects, such as the flow over an aircraft wing, which is critical for understanding lift and drag forces. In computer graphics, a flow field might be used to simulate the movement of hair, fur, or cloth, where each strand or thread is influenced by a simulated flow field to create realistic motion. For robotics and autonomous vehicles, a flow field could be used to navigate through an environment by mapping the flow of surrounding features, aiding in obstacle avoidance and path planning. In medical imaging, flow fields can be used to analyze the movement of tissues or fluids within the body, such as blood flow in vessels or respiratory motion, which is important for diagnostic and therapeutic applications.

In this way, the disclosed techniques improve the overall experience of the user in using the electronic device and reduce the overall amount of resources needed to accomplish a task of producing high-quality images and producing realistic XR experiences. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logo, AR emblem, pants, shorts, jacket, blouse, glasses, jewelry, earrings, bunny ears, a hat, earmuffs, makeup, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112. An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other applications 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client side by the interaction client 104 and on the server side by the interaction servers 124. Example subsystems are discussed below and can include a pixel-based deformation system 500 that receives one or more images depicting a real-world object (e.g., a person wearing a given fashion item) and one or more source images depicting a target fashion item that includes a plurality of parts (e.g., lower right arm, lower left arm, upper right arm, upper left arm, torso, and so forth. The pixel-based deformation system 500 analyzes the one or more images and the one or more source images by applying one or more machine learning models to a set of data comprising a plurality of flow fields each associated with a different one of the plurality of parts of the target fashion item, each of the plurality of flow fields indicating existence and location of each pixel of the one or more images in the source image. The target fashion item, including the plurality of parts is adjusted (e.g., reposed or has its pose modified) to match a pose of the person depicted in one or more images. This way, the target fashion item can be overlaid on the person depicted in the one or more images, including the plurality of parts.

In some cases, the plurality of parts are independently processed by the one or more machine learning models in a low resolution manner (e.g., 33×33 image resolution) and the resulting flow fields are up-sampled (e.g., using source part masks) to generate the image depicting the target fashion item overlaid on the person. An illustrative implementation of the pixel-based deformation system 500 is shown and described in connection with FIG. 5 below.

In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with each other through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 (shown in FIG. 10) of a user system 102. These augmentations are selected by the augmentation system 206 and presented to a user of an interaction client 104, based on a number of inputs and data, such as, for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at the user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
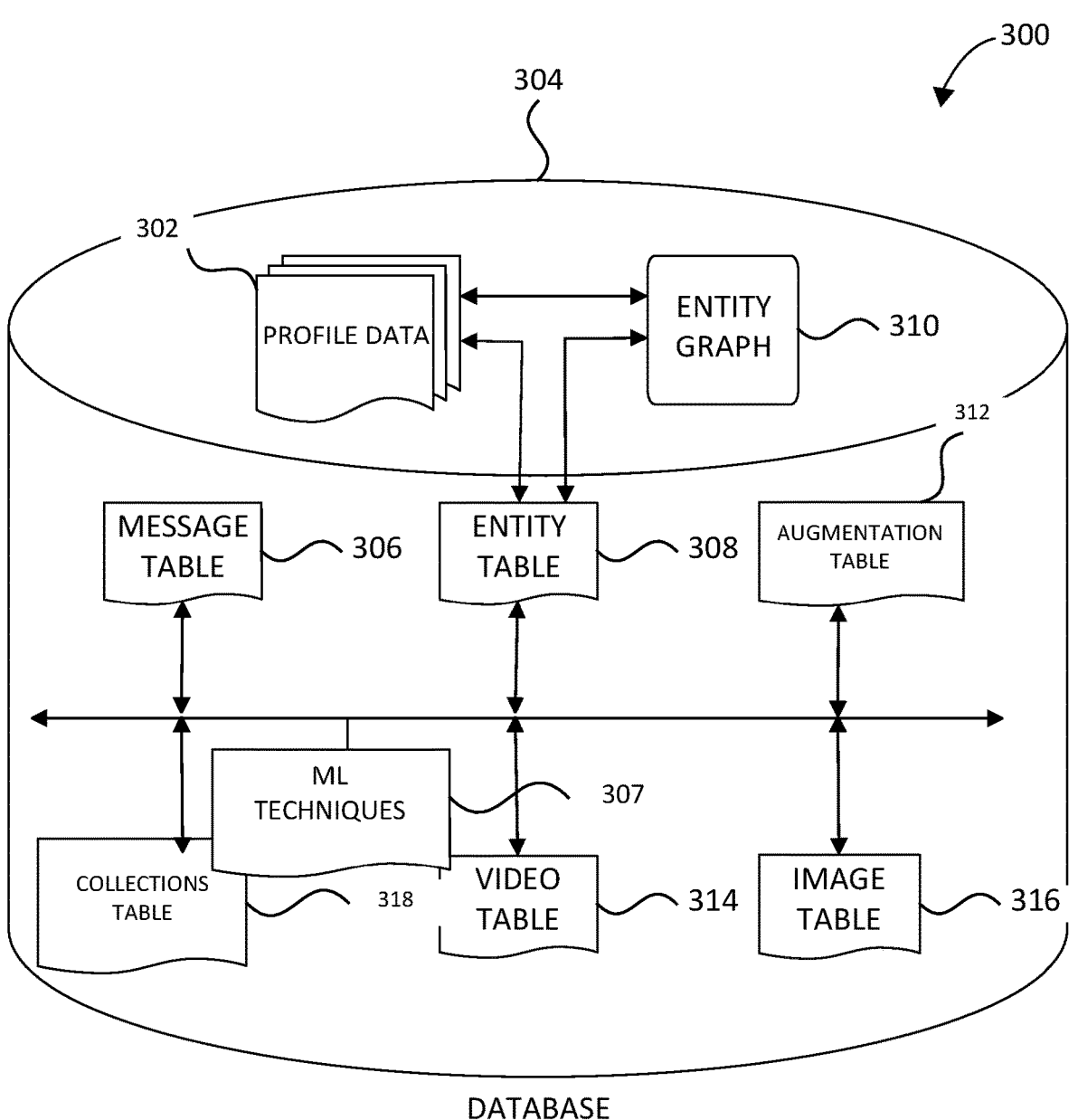
FIG. 3 is a diagrammatic representation of a data structure as maintained in a database, according to some examples.

A user management system 218 is operationally responsible for the management of user data and profiles, and maintains entity information (e.g., stored in entity tables 308, entity graphs 310, and profile data 302 of FIG. 3) regarding users and relationships between users of the interaction system 100.

A collection management system 220 is operationally responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, e.g., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional (2D) avatars of users with or without different avatar characteristics). As another example, external resources that include small-scale versions of applications (e.g., web-based versions of applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content, XR experiences, and AR experiences, such as adding virtual objects or animations to real-world images and videos. The communication system 208 and messaging system 210 may use the artificial intelligence and machine learning system 230 to analyze communication patterns and provide insights into how users interact with each other and provide intelligent message classification and tagging, such as categorizing messages based on sentiment or topic.

The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

In some cases, the artificial intelligence and machine learning system 230 can be used to implement the functions and/or components discussed below in connection with FIG. 5.

Data Architecture

FIG. 3 is a schematic diagram illustrating data structures 300, which may be stored in a database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data, or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100 and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying "lenses" or AR experiences). An AR content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning techniques 307 that store parameters of one or more machine learning models that have been trained during training of the pixel-based deformation system 500. For example, trained machine learning techniques 307 store the trained parameters of one or more artificial neural network machine learning models or techniques.

Data Communications Architecture

Figure 4:
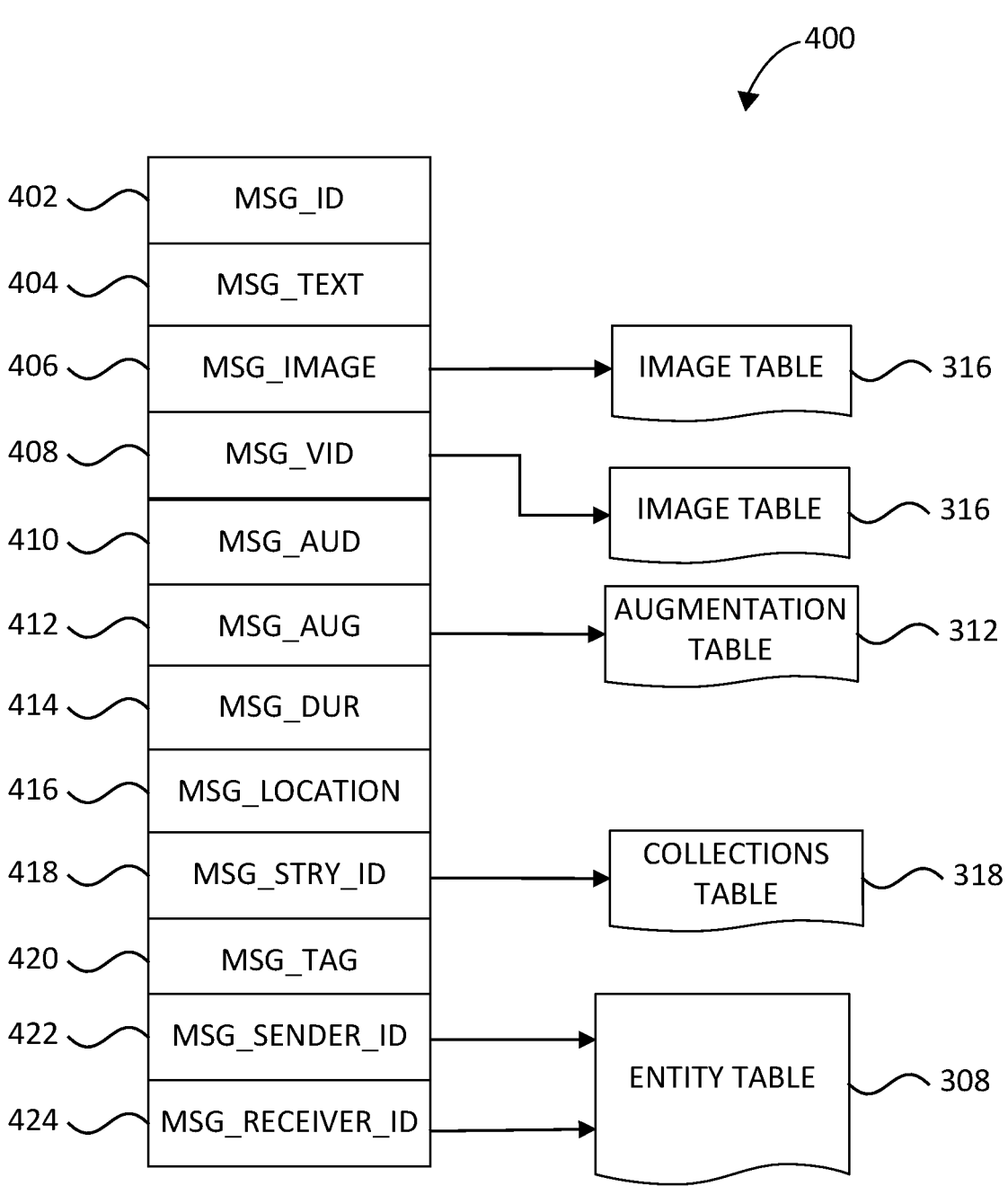
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements)

that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Pixel-Based Deformation System

Figure 5:
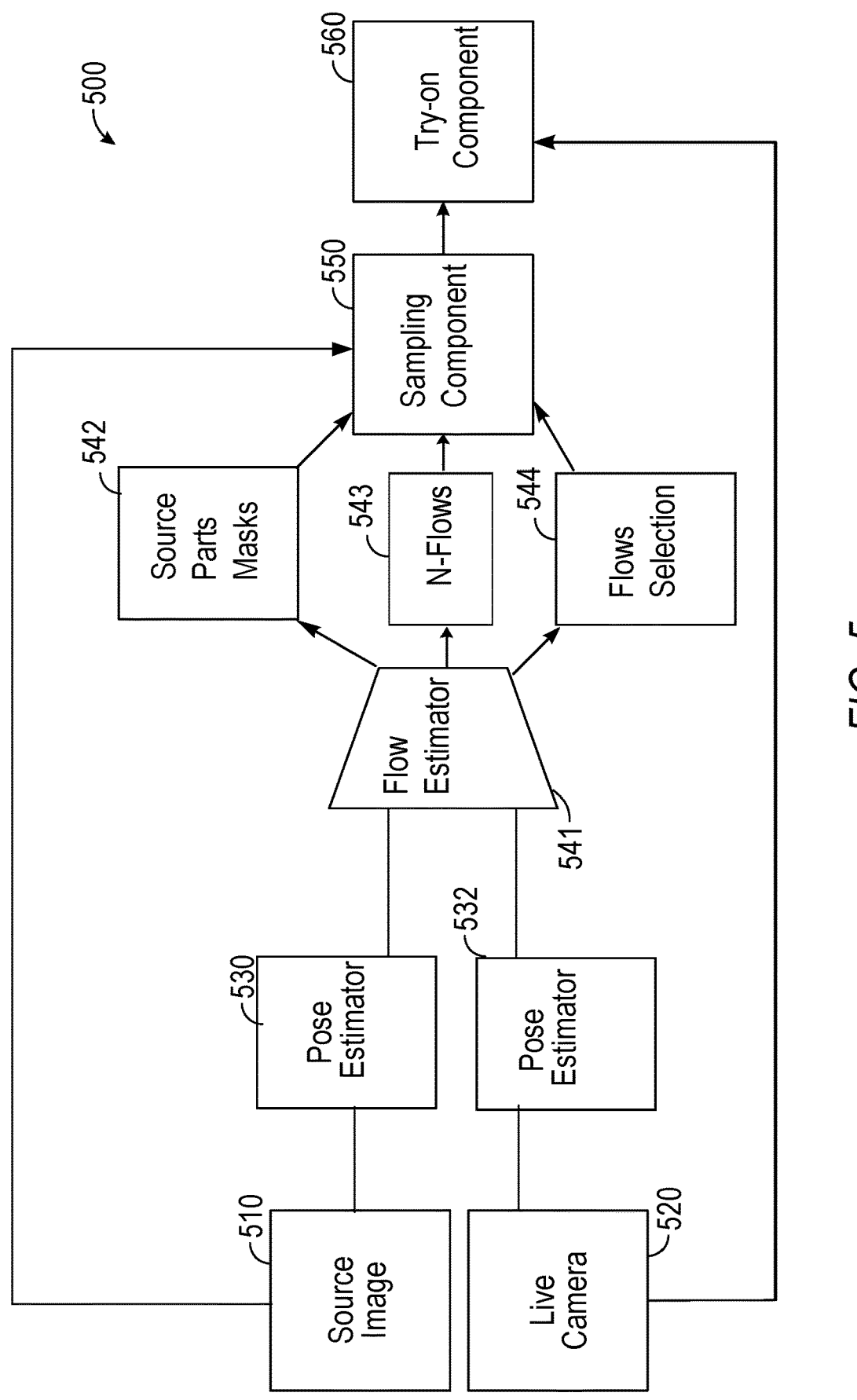
FIG. 5 is a diagrammatic representation of a pixel-based deformation system, according to some examples.

FIG. 5 is a block diagram showing an example pixel-based deformation system 500, according to some examples. The pixel-based deformation system 500 includes an input component that receives a source image 510 and a live camera image 520, pose estimators 530 and 532, a flow estimator 541, source part masks 542, an n-flows component

543, a flows selection component 544, a sampling component 550, and an output component providing a try-on component 560 (e.g., an output for an XR experience). Together, these components enable the pixel-based deformation system 500 to generate, access, and/or receive one or more images depicting a real-world object and source images depicting a fashion item (including a plurality of parts) and analyze the one or more images and source images using one or more machine learning models (e.g., the pose estimator 530, the flow estimator 541, the source part masks 542, the n-flows component 543, and/or the flows selection component 544) to generate a new image (or modify the received one or more images) depicting the real-world object wearing the fashion item from the source images.

The input component of the pixel-based deformation system 500 receives the source image 510 and the live camera image 520. The live camera image 520 can be received from a front-facing or rear-facing camera of the user system 102. In some cases, the live camera image 520 is received by accessing previously stored images in the user system 102 and/or images received from another user system 102. The live camera image 520 can depict a real-world object (e.g., a first person wearing a given fashion item) in a real-world scene or environment. In some cases, the live camera image 520 depicts a virtual object in a real-world or virtual scene.

The source image 510 can depict a target fashion item that includes a plurality of parts of a person wearing the target fashion item (e.g., hoodie, train of a dress, puffy sleeves, and so forth). The source image 510 can be received from another user system 102. In some cases, the source image 510 is received by accessing an online webpage that includes a plurality of images of different fashion items. The user system 102 receives input that taps or selects an individual image of the plurality of images. The selected image is provided as the source image 510. The source image 510 can be captured by a camera of the user system 102. For example, the camera can be pointed at a virtual or real-world object that includes the target fashion item and an image can be captured by the camera and stored as the source image 510.

Input can be received from a user, such as by activating a particular virtual try-on XR experience on the user system 102. In some examples, the input includes a voice command from the user asking the pixel-based deformation system 500 to modify the live camera image 520 to replace a depiction of the given fashion item with the target fashion item depicted in the source image 510. In some cases, a plurality of different XR experiences is represented using different icons. Each XR experience can correspond to a different one of a plurality of source images 510. In response to receiving input that selects a particular icon for a particular XR experience, the source image 510 associated with the particular XR experience is retrieved and used to replace a depiction of the given fashion item in the live camera image 520 with the target fashion item associated with or depicted in the source image 510.

The source image 510 is provided to a pose estimator 530. The live camera image 520 can be provided to the pose estimator 532 (which is another instance of the pose estimator 530). The pose estimator 530 implements one or more machine learning models that are configured to detect and determine a pose of the real-world object (e.g., person) depicted in the source image 510. In some examples, the pose estimator 530 includes a skeletal model that generates a skeleton representing the body part positions and orientations of the real-world object depicted in the source image 510. For example, if the hands of the real-world object are raised above a head of the real-world object and turned in a particular direction, the pose estimator 530 similarly generates or poses the skeleton to have the hands of the skeleton raised above the head of the skeleton.

The pose estimator 532 implements one or more machine learning models that are configured to detect and determine a pose of the real-world object (e.g., person) depicted in the live camera image 520. In some examples, the pose estimator 532 includes a skeletal model that generates a skeleton representing the body part positions and orientations of the real-world object depicted in the live camera image 520. For example, if the hands of the real-world object are raised above the head of the real-world object and turned in a particular direction, the pose estimator 532 similarly generates or poses the skeleton to have the hands of the skeleton raised above the head of the skeleton. The pose estimator 530 and the pose estimator 532 output pose information representing poses of the objects (e.g., persons) depicted in the source image 510 and the live camera image 520.

The live camera image 520, the source image 510, the pose information generated by the pose estimator 530, and/or the pose information generated by the pose estimator 532 are provided to the flow estimator 541. In some cases, all of the live camera image 520, the source image 510, the pose information generated by the pose estimator 530, and the pose information generated by the pose estimator 532 are provided to the flow estimator 541. In some cases, only the pose information generated by the pose estimator 530 and the pose information generated by the pose estimator 532 are provided to the flow estimator 541.

The flow estimator 541 is trained to process the live camera image 520, the source image 510, the pose information generated by the pose estimator 530, and/or the pose information generated by the pose estimator 532 to generate, estimate, or predict a plurality of flow fields. Specifically, the flow estimator 541 is trained to generate a separate flow field for each part of the fashion item depicted in the source image 510. For example, the flow estimator 541 generates a first flow field that indicates the existence and/or location of each pixel in the live camera image 520 for a first part (e.g., a lower left arm). Similarly, the flow estimator 541 generates a second flow field that indicates the existence and/or location of each pixel in the live camera image 520 for a second part (e.g., an upper left arm). The flow estimator 541 generates a third flow field that indicates the existence and/or location of each pixel in the live camera image 520 for a third part (e.g., an upper right arm). The flow estimator 541 generates a fourth flow field that indicates the existence and/or location of each pixel in the live camera image 520 for a fourth part (e.g., a lower right arm). The flow estimator 541 generates a fifth flow field that indicates the existence and/or location of each pixel in the live camera image 520 for a fifth part (e.g., a torso). Any number of additional flow fields can be generated by the flow estimator 541 depending on the type of fashion item depicted in the source image 510 and that is to be overlaid on the live camera image 520. Together, these plurality of flow fields can be output as one of a set of data from the flow estimator 541. Namely, the plurality of flow fields can be collectively output as the n-flows component 543.

Each flow field output by the flow estimator 541 includes information indicating, for each pixel in the live camera image 520 or the pose information generated by the pose estimator 532, whether a corresponding pixel exists in the corresponding part of the fashion item depicted in the source image 510 and/or the pose information generated by the pose estimator 530. If a pixel exists in the source image 510 and/or the pose information generated by the pose estimator 530, the corresponding flow field also specifies the coordinates or location (e.g., x and y coordinates) of the corresponding pixel. For example, the flow estimator 541 can determine that a pixel of a torso of a person depicted in the live camera image 520 has a corresponding pixel of a torso of a person depicted in the source image 510. In such cases, the flow estimator 541 can generate a flow field associated with the torso identifying the existence of the pixel of the torso of the person depicted in the live camera image 520 in the source image 510 and also the coordinates of that pixel in the source image 510. Similarly, the flow estimator 541 can determine that a pixel of a lower left arm depicted in the live camera image 520 fails to exist in the source image 510 corresponding to the torso part and can indicate this information in the flow field for the torso. In this way, the flow field for the torso can specify correspondence between pixels in the live camera image 520 and pixels in the source image 510 for a specific part, such as the torso.

Each of the other flow fields similarly provides information for the corresponding parts they represent. For example, the flow estimator 541 can determine that a pixel of a lower left arm of a person depicted in the live camera image 520 has a corresponding pixel of a lower left arm of a person depicted in the source image 510. In such cases, the flow estimator 541 can generate a flow field associated with the lower left arm identifying the existence of the pixel of the lower left arm of the person depicted in the live camera image 520 in the source image 510 and also the coordinates of that pixel in the source image 510. Similarly, the flow estimator 541 can determine that a pixel of the torso depicted in the live camera image 520 fails to exist in the source image 510 corresponding to the lower left arm part and can indicate this information in the flow field for the lower left arm. In this way, the flow field for the lower left arm can specify correspondence between pixels in the live camera image 520 and pixels in the source image 510 for a specific part, such as the lower left arm.

The flow estimator 541 can also generate other information as part of the set of data that is output from the flow estimator 541. For example, the flow estimator 541 can generate the source part masks 542 and/the flows selection component 544. The source part masks 542 can specify correspondence between the plurality of parts of the target fashion item depicted in the source image 510 and each pixel in the source image 510. Namely, the source part masks 542 for the torso part of the fashion item can provide a map that defines the region of the source image 510 that includes the torso part of the fashion item and that indicates the coordinates or locations of those pixels. The map can also specify other portions or pixels of the source image 510 that fail to include or are not associated with the torso part of the fashion item. Similarly, the source part masks 542 for the lower left arm part of the fashion item can provide a map that defines the region of the source image 510 that includes the lower left arm part of the fashion item and that indicates the coordinates or locations of those pixels. The map can also specify other portions or pixels of the source image 510 that fail to include or are not associated with the lower left arm part of the fashion item, such as the torso and upper left arm.

The flows selection component 544 specifies a correspondence between the plurality of parts of the target fashion item depicted in the source image 510 and each pixel in the live camera image 520. Namely, the flows selection component 544 for the torso part of the fashion item can provide a map that defines the region of the source image 510 that includes the torso part of the fashion item and that corresponds to a pixel in the live camera image 520. The map can also specify other portions or pixels of the source image 510 that fail to include or are not associated with the torso part of the fashion item. The flows selection component 544 indicates which part of the target fashion item corresponds to which portion or pixel of the live camera image 520.

The flow estimator 541 can provide the n-flows component 543 (including the plurality of individual flow fields for each of the plurality of parts of the fashion item depicted in the source image 510) to the sampling component 550. The n-flows component 543 can provide each of the flow fields in a first image resolution, such as 33×33 image resolution or some other image resolution that is lower than the image resolution of the source image 510 and/or the live camera image 520. The sampling component 550 can also receive the source image 510, the live camera image 520, the source part masks 542, and/or the flows selection component 544.

The sampling component 550 can sample and/or retrieve pixel values from the source image 510 that are determined to have existing pixels in the live camera image 520 by the n-flows component 543 based on the source part masks 542 and/or the flows selection component 544. The sampling component 550 can also use the flow field to determine an adjustment (e.g., rotation, blur, color change, or other visual modification) to the pixels that are determined to exist in the flow field. The sampling component 550 can adjust those pixels to match the pose of the person depicted in the live camera image 520. Namely, the pixels of the target fashion item can be in a first pose of the person depicted in the source image 510. Such pixels can be adjusted to match the pose of the person depicted in the live camera image 520.

In some examples, the sampling component 550 can select selecting an individual pixel from a first flow field of the plurality of flow fields received as part of the n-flows component 543. The sampling component 550 can use the flows selection component 544 to determine a first part of the plurality of parts that is associated with the individual pixel. For example, the sampling component 550 can access a map included as part of the flows selection component 544 for the individual pixel to determine that the individual pixel of the first flow field corresponds to the torso part of the target fashion item. The flows selection component 544 can, in response, obtain a first source part mask from the source part masks 542 that are associated with the torso part. The flows selection component 544 can then determine whether the individual pixel is included in the first source part mask or not. The flows selection component 544 can then select one or more pixels from the source image 510 to replace pixels in the source image 510 based on determining whether the individual pixel is included in the first source part mask. Namely, in response to determining that the individual pixel is included in the first source part mask, the sampling component 550 replaces the individual pixel in the live camera image 520 based on a corresponding pixel of the source image 510 identified by the first source part mask. This results in a modified live camera image 520 that has a higher image resolution than the first flow field as the pixels are selected from the source image 510 (which has the higher image resolution) using the first flow field based on the corresponding part determination.

Similarly, the sampling component 550 can select an additional individual pixel from a second flow field of the plurality of flow fields received as part of the n-flows component 543. The sampling component 550 can use the flows selection component 544 to determine a second part of the plurality of parts that is associated with the additional individual pixel. For example, the sampling component 550 can access a map included as part of the flows selection component 544 for the additional individual pixel to determine that the additional individual pixel of the second flow field corresponds to the lower left arm part of the target fashion item. The flows selection component 544 can, in response, obtain a second source part mask from the source part masks 542 that are associated with the lower left arm part. The flows selection component 544 can then determine whether the additional individual pixel is included in the second source part mask or not. The flows selection component 544 can then select one or more pixels from the source image 510 to replace pixels in the source image 510 based on determining whether the additional individual pixel is included in the second source part mask. Namely, in response to determining that the additional individual pixel is included in the second source part mask, the sampling component 550 replaces the additional individual pixel in the live camera image 520 based on a corresponding pixel of the source image 510 identified by the second source part mask.

The adjusted pixels of the target fashion item are provided by the sampling component 550 to the try-on component 560. The try-on component 560 generates a new image depicting the real-world object depicted in the live camera image 520 wearing the target fashion item depicted in the source image 510.

For example, the flow estimator 541 and/or the pose estimator 530 and/or the pose estimator 532 (referred to as one or more machine learning models) are trained to access training data that includes a first training image depicting a first training object in a first training pose, a second training image depicting a second training object in a second training pose, and a set of ground truth flow fields and a set of ground truth segmentation masks. The one or more machine learning models analyze the first and second training images to estimate a first flow field for a first body part using a first ground truth segmentation mask of the set of ground truth segmentation masks corresponding to the first body part. The one or more machine learning models analyze the first and second training images to estimate a second flow field for a second body part using a second ground truth segmentation mask of the set of ground truth segmentation masks corresponding to the second body part. The one or more machine learning models compute a loss based on a deviation between the estimated first and second flow fields for the first and second training images and the set of ground flow fields. One or more parameters of the one or more machine learning models are updated based on the computed loss. These training operations are repeated until a stopping criterion is met.

In some examples, the training data is generated based on multiple sets of images. For example, the training data can be generated by accessing a first set of images depicting one or more objects and accessing a second set of images depicting one or more fashion items. The set of ground truth segmentation masks that segment individual parts of the one or more fashion items is generated. A first ground truth flow field indicating existence and location in the second set of images of a first part of the one or more objects depicted in the first set of images is computed. A second ground truth flow field indicating existence and location in the second set of images of a second part of the one or more objects depicted in the first set of images is computed. Then, the first and second ground truth flow fields and the set of ground truth segmentation masks are associated with the first and second sets of images to generate the training data.

Figure 6:
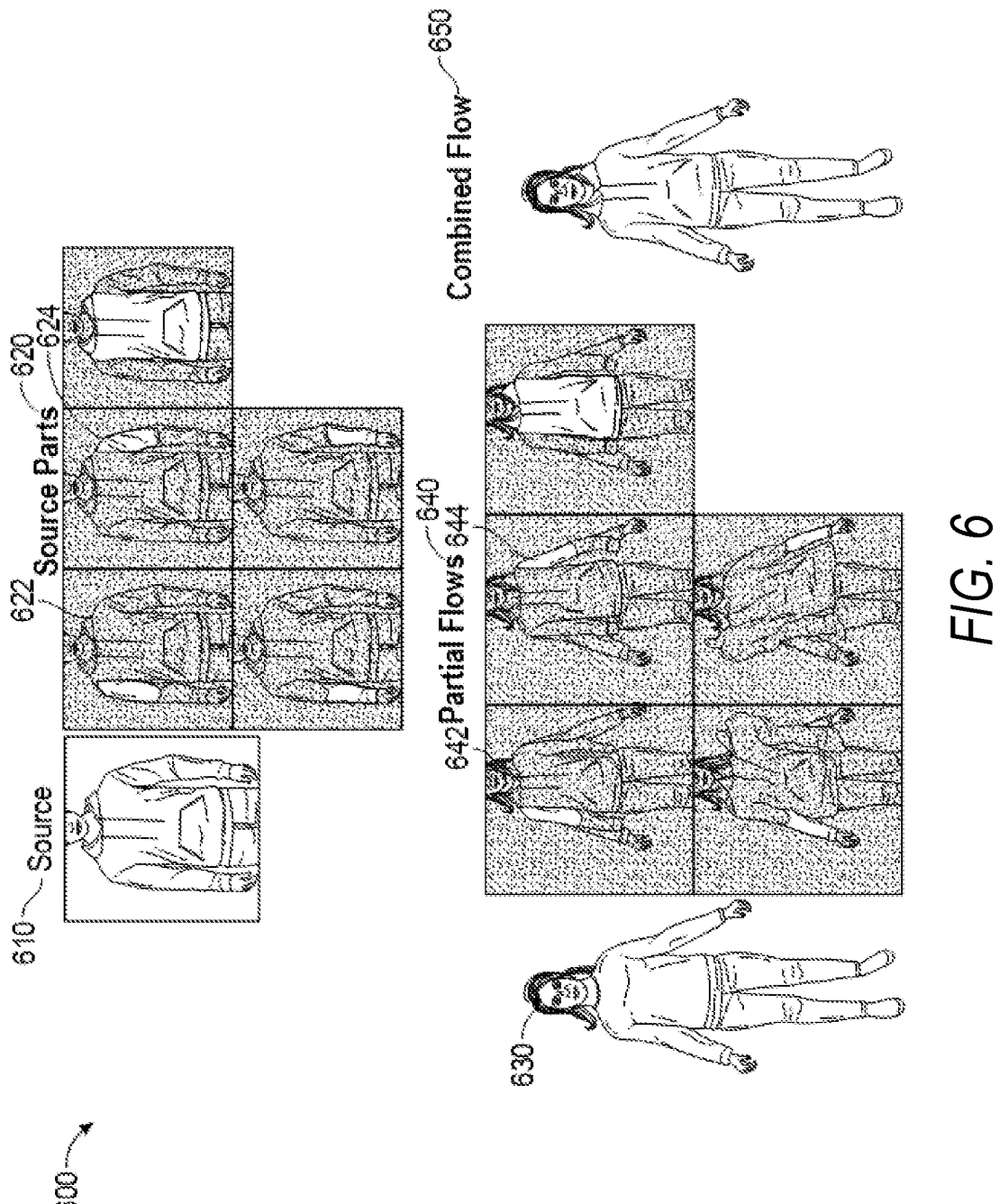
FIG. 6 is a diagrammatic representation of example inputs and outputs of the pixel-based deformation system, according to some examples.

In some examples, as shown in the diagram 600 of FIG. 6, the pixel-based deformation system 500 can receive a source image 610 and one or more live images 630. The source image 610 depicts a person wearing a target fashion item. The target fashion item depicted in the source image 610 includes a plurality of parts 620. For example, the target fashion item includes a first part (e.g., an upper right arm part) that is associated with and used to generate a first source part mask 622. The target fashion item includes a second part (e.g., an upper left arm part) that is associated with and used to generate a second source part mask 624.

The pixel-based deformation system 500 can process the source image 610 along with the one or more live images 630. The one or more live images 630 depicts another person wearing some other fashion item. The pixel-based deformation system 500 can generate a plurality of flow fields 640 each indicating, for a different part of the fashion item, correspondence between each pixel in the one or more live images 630 and each pixel in the source image 610.

For example, each flow field indicates, for a corresponding part, whether any given pixel in the one or more live images 630 has a corresponding matching pixel in the source image 610 for that corresponding part and, if so, its coordinates or location. Namely, the plurality of flow fields 640 includes a first flow field 642 that corresponds to the upper right arm part. The first flow field 642 indicates whether any given pixel in the one or more live images 630 has a corresponding matching pixel in the source image 610 for the upper right art part and, if so, its coordinates or location. Portions of the first flow field 642 that are shaded represent pixels of the one or more live images 630 that do not have a corresponding pixel in the part of the fashion item depicted in the source image 610. Portions of the first flow field 642 that are non-shaded represent pixels of the one or more live images 630 that have a corresponding pixel in the part of the fashion item depicted in the source image 610. The plurality of flow fields 640 includes a second flow field 644 that corresponds to the upper left arm part. The second flow field 644 indicates whether any given pixel in the one or more live images 630 has a corresponding matching pixel in the source image 610 for the upper left art part and, if so, its coordinates or location. Portions of the second flow field 644 that are shaded represent pixels of the one or more live images 630 that do not have a corresponding pixel in the part of the fashion item depicted in the source image 610. Portions of the second flow field 644 that are non-shaded represent pixels of the one or more live images 630 that have a corresponding pixel in the part of the fashion item depicted in the source image 610.

Using the source parts 620 and the plurality of flow fields 640, the pixel-based deformation system 500 can warp or deform pixels of a target fashion item. The deformed pixels of the target fashion item are then overlaid on the one or more live images 630 to replace the depiction of the fashion item in the one or more live images 630. As a result, the one or more live images 630 depicts the person wearing the deformed fashion item represented as the combined flow image 650.

FIG. 7 is a flowchart of a process or method 700 performed by the pixel-based deformation system 500, according to some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 701, the pixel-based deformation system 500 (e.g., a user system 102 or a server) receives one or more images depicting a first person in a first pose, as discussed above.

At operation 702, the pixel-based deformation system 500 receives a source image depicting a target fashion item worn on a portion of a body of a second person in a second pose, the target fashion item comprising a plurality of parts, as discussed above.

At operation 703, the pixel-based deformation system 500 processes, using one or more machine learning models, the one or more images together with the source image to generate a set of data comprising a plurality of flow fields each associated with a different one of the plurality of parts of the target fashion item, each of the plurality of flow fields indicating existence and location of each pixel of the one or more images in the source image, as discussed above.

At operation 704, the pixel-based deformation system 500 modifies, based on the set of data generated by the one or more machine learning models, a portion of the one or more images to overlay the target fashion item on the first person in the first pose, as discussed above.

In some cases, an alternative to using the flow field to overlay the target fashion item on the first person, a warping or morphing algorithm may be used. A warping or morphing algorithm is a transformation technique used in image processing to smoothly transition or map one image onto another. This involves adjusting the coordinates of the pixels in the source images to align with the corresponding structure in the target image. Warping can be used to fit or overlay images in a way that accounts for differences in scale, rotation, and perspective. Other techniques that can be used include homography transformation. This is a technique that maps points between two images in plane-to-plane correspondences. It is often used in the context of image stitching or when overlaying images onto planar surfaces. An affine transformation includes scaling, rotation, translation, and shearing. It can be used to align images but does not support perspective distortions. Another technique uses Bézier curves to control the image warp. It is often used in graphic design and animation to create complex transformations. Thin Plate Spline (TPS) technique is a smooth interpolation method that can bend a grid to align control points between images. It is useful for non-rigid transformations. Feature-based alignment technique uses key features or landmarks in the images to guide the transformation, ensuring that important aspects are matched between the overlaid items and the target image. Deformable models, such as active shape models or active contour models, can be used to fit a shape to an image by deforming a model to match the image data. Deep Learning-based Image Synthesis using neural networks can be trained to generate and overlay images in a realistic manner, learning the appropriate transformations from a large dataset of examples. Each of these alternatives provides a different approach to the problem of overlaying images in a realistic and coherent manner. The choice of technique would depend on the specific requirements of the application, such as the need for handling non-rigid transformations, the level of detail required, and the computational resources available.

EXAMPLES

Example 1. A method comprising: receiving, by one or more processors, one or more images depicting a first person in a first pose; receiving a source image depicting a target fashion item worn on a portion of a body of a second person in a second pose, the target fashion item comprising a plurality of parts; processing, using one or more machine learning models, the one or more images together with the source image to generate a set of data comprising a plurality of flow fields each associated with a different one of the plurality of parts of the target fashion item, each of the plurality of flow fields indicating existence and location of each pixel of the one or more images in the source image; and modifying, based on the set of data generated by the one or more machine learning models, a portion of the one or more images to overlay the target fashion item on the first person in the first pose.

Example 2. The method of Example 1, wherein the set of data comprises source part masks and flow selection information.

Example 3. The method of Example 2, wherein the source part masks specify correspondence between the plurality of parts of the target fashion item and each pixel in the source image.

Example 4. The method of any one of Examples 2-3, wherein the flow selection information specifies a correspondence between the plurality of parts of the target fashion item and each pixel in the one or more images.

Example 5. The method of any one of Example 2-4, further comprising: sampling the source image using the plurality of flow fields to select one or more pixels from the source image to replace one or more target pixels in the one or more images.

Example 6. The method of Example 5, wherein sampling the source image comprises: selecting an individual pixel from a first flow field of the plurality of flow fields; determining, based on the flow selection information, a first part of the plurality of parts that is associated with the individual pixel; obtaining a first source part mask of the source parts mask that corresponds to the first part; and determining whether the individual pixel is included in the first source part mask, the one or more pixels being selected from the source image to replace the one or more target pixels in the one or more images based on determining whether the individual pixel is included in the first source part mask.

Example 7. The method of Example 6, further comprising: in response to determining that the individual pixel is included in the first source part mask, replacing the individual pixel in the one or more images based on a corresponding pixel of the one or more pixels in the first source part mask.

Example 8. The method of any one of Examples 6-7, wherein sampling the source image comprises: selecting an additional individual pixel from a second flow field of the plurality of flow fields; determining, based on the flow selection information, a second part of the plurality of parts that is associated with the additional individual pixel; obtaining a second source part mask of the source parts mask that corresponds to the second part; and determining whether the additional individual pixel is included in the second source part mask, the one or more pixels being selected from the source image to replace the one or more target pixels in the one or more images based on determining whether the additional individual pixel is included in the second source part mask.

Example 9. The method of any one of Examples 1-8, wherein the plurality of parts comprise upper arms, lower arms, left arm, right arm, and torso.

Example 10. The method of any one of Examples 1-9, wherein a first flow field of the plurality of flow fields associated with a first part of the plurality of parts comprises a first image resolution, wherein the first part modified portion of the one or more images comprising the target fashion item comprises a second image resolution that is greater than the first image resolution.

Example 11. The method of Example 10, wherein an image resolution of each of the plurality of flow fields is lower than the modified portion of the one or more images.

Example 12. The method of any one of Examples 1-11, wherein the first image resolution is 33×33 pixels.

Example 13. The method of any one of Examples 1-12, further comprising: applying a pose estimation machine learning model to the one or more images to generate first pose estimation information representing the first pose of the first person; and applying the pose estimation machine learning model to the source image to generate second pose estimation information representing the second pose of the second person.

Example 14. The method of any one of Examples 1-13, further comprising: processing, by a flow estimation machine learning model, the first pose estimation information and the second pose estimation information, to generate the set of data.

Example 15. The method of any one of Examples 1-14, further comprising: sampling one or more pixels of the source image based on the flow field to extract and adjust a pose of the target fashion item to match the first pose of the first person.

Example 16. The method of any one of Examples 1-15, wherein the one or more machine learning models comprise a convolutional neural network associated with a fashion item extended reality (XR) experience.

Example 17. The method of any one of Examples 1-16, wherein the one or more machine learning models are trained by performing training operations comprising: accessing training data comprising a first training image depicting a first training object in a first training pose, a second training image depicting a second training object in a second training pose, and a set of ground truth flow fields and a set of ground truth segmentation masks; analyzing, using the one or more machine learning models, the first and second training images to estimate a first flow field for a first body part using a first ground truth segmentation mask of the set of ground truth segmentation masks corresponding to the first body part; analyzing, using the one or more machine learning models, the first and second training images to estimate a second flow field for a second body part using a second ground truth segmentation mask of the set of ground truth segmentation masks corresponding to the second body part; computing a loss based on a deviation between the estimated first and second flow fields for the first and second training images and the set of ground flow fields; and updating one or more parameters of the one or more machine learning models based on the computed loss.

Example 18. The method of Example 17, further comprising generating the first and second training images by performing operations comprising: accessing a first set of images depicting one or more objects; accessing a second set of images depicting one or more fashion items; generating the set of ground truth segmentation masks that segment individual parts of the one or more fashion items; computing a first ground truth flow field indicating existence and location in the second set of images of a first part of the one or more objects depicted in the first set of images; computing a second ground truth flow field indicating existence and location in the second set of images of a second part of the one or more objects depicted in the first set of images; and associating the first and second ground truth flow fields and the set of ground truth segmentation masks with the first and second sets of images.

Example 19. A system comprising: at least one processor; and at least one memory component having instructions stored thereon that, when executed by the at least one processor, cause the at least one processor to perform operations comprising: receiving one or more images depicting a first person in a first pose; receiving a source image depicting a target fashion item worn on a portion of a body of a second person in a second pose, the target fashion item comprising a plurality of parts; processing, using one or more machine learning models, the one or more images together with the source image to generate a set of data comprising a plurality of flow fields each associated with a different one of the plurality of parts of the target fashion item, each of the plurality of flow fields indicating existence and location of each pixel of the one or more images in the source image; and modifying, based on the set of data generated by the one or more machine learning models, a portion of the one or more images to overlay the target fashion item on the first person in the first pose.

Example 20. A non-transitory computer-readable storage medium having stored thereon instructions that, when executed by at least one processor, cause the at least one processor to perform operations comprising: receiving one or more images depicting a first person in a first pose; receiving a source image depicting a target fashion item worn on a portion of a body of a second person in a second pose, the target fashion item comprising a plurality of parts; processing, using one or more machine learning models, the one or more images together with the source image to generate a set of data comprising a plurality of flow fields each associated with a different one of the plurality of parts of the target fashion item, each of the plurality of flow fields indicating existence and location of each pixel of the one or more images in the source image; and modifying, based on the set of data generated by the one or more machine learning models, a portion of the one or more images to overlay the target fashion item on the first person in the first pose.

Machine Architecture

Figure 8:
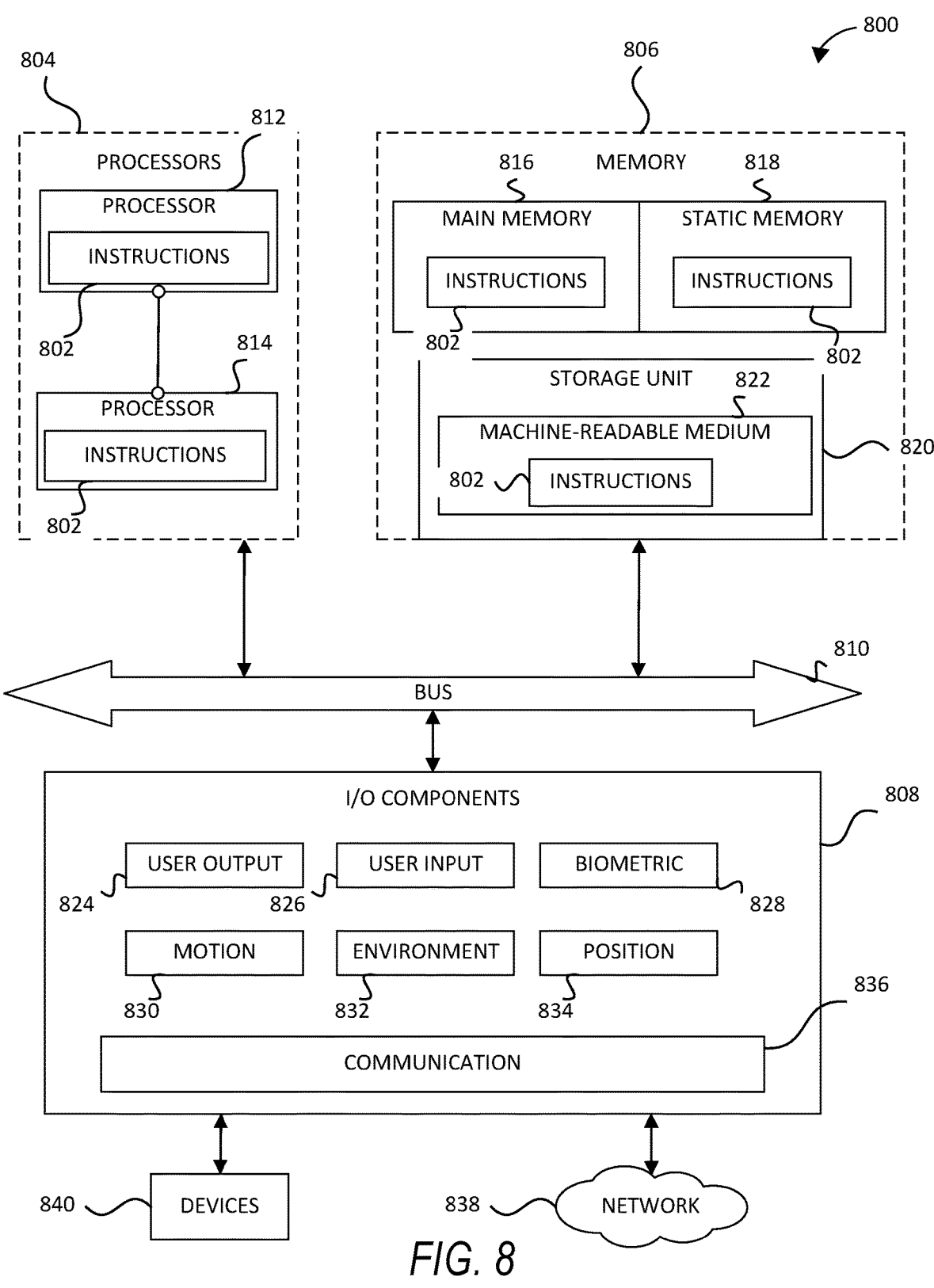
FIG. 8 is a diagrammatic representation of a machine in the form of a computer system within which a set of instructions may be executed to cause the machine to perform any one or more of the methodologies discussed herein, according to some examples.

FIG. 8 is a diagrammatic representation of a machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the methods described herein. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. The machine 800, for example, may comprise the user system 102 or any one of multiple server devices forming part of the interaction server system 110. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output (I/O) components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, all accessible to the processors 804 via the bus 810. The main memory 806, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad, or penta rear camera configurations on the front and rear sides of the user system 102. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a universal serial bus (USB)).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™ MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., HTTP). Similarly, the instructions 802 may be transmitted or received using a transmission medium via a coupling (e.g., a peer-to-peer coupling) to the devices 840.

Software Architecture

Figure 9:
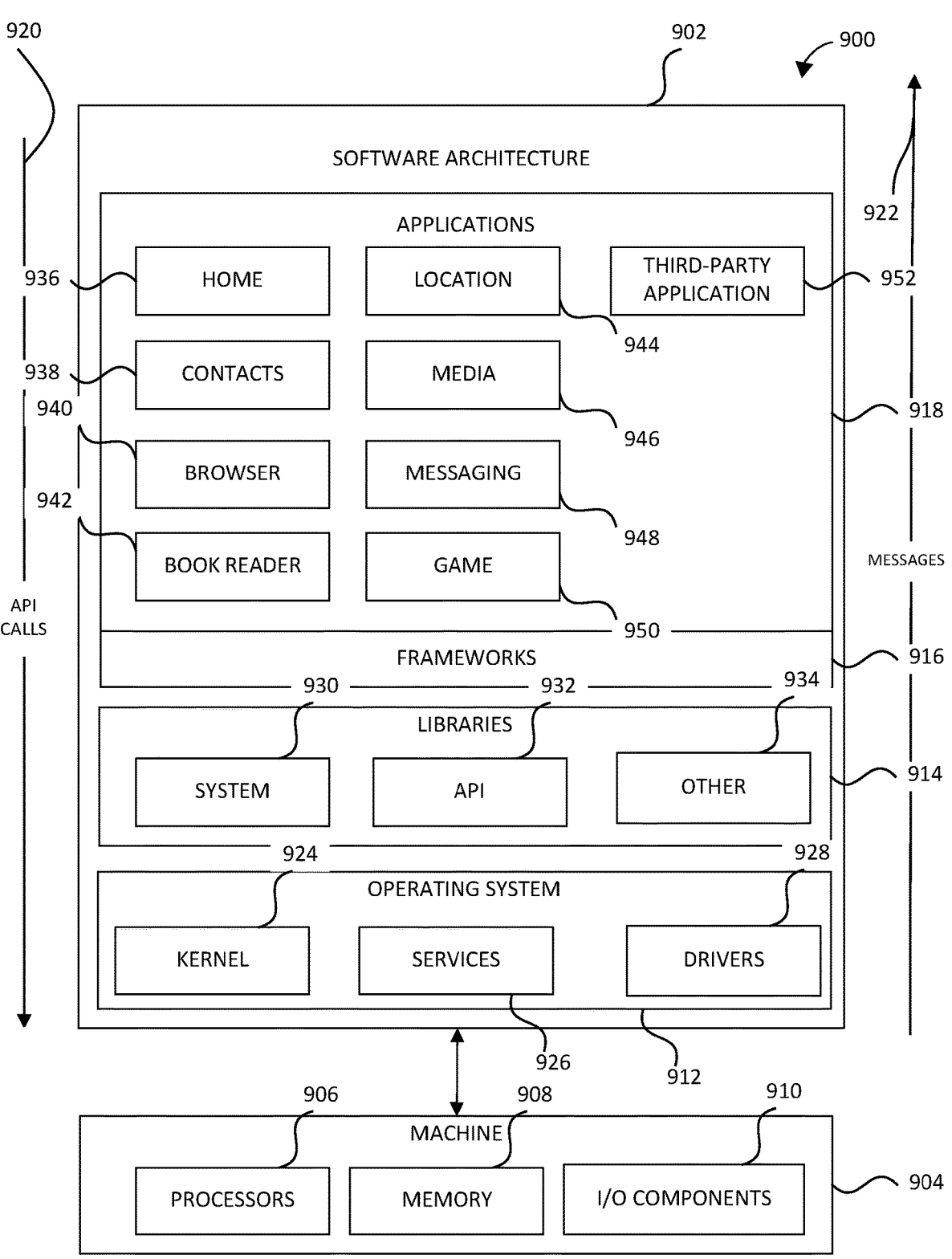
FIG. 9 is a block diagram showing a software architecture within which examples may be implemented.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various GUI functions, high-level resource management, and high-level location services. The frameworks 916 can provide a broad spectrum of other APIs that can be used by the applications 918, some of which may be specific to a particular operating system or platform.

In an example, the applications 918 may include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

System with Head-Wearable Apparatus

Figure 10:
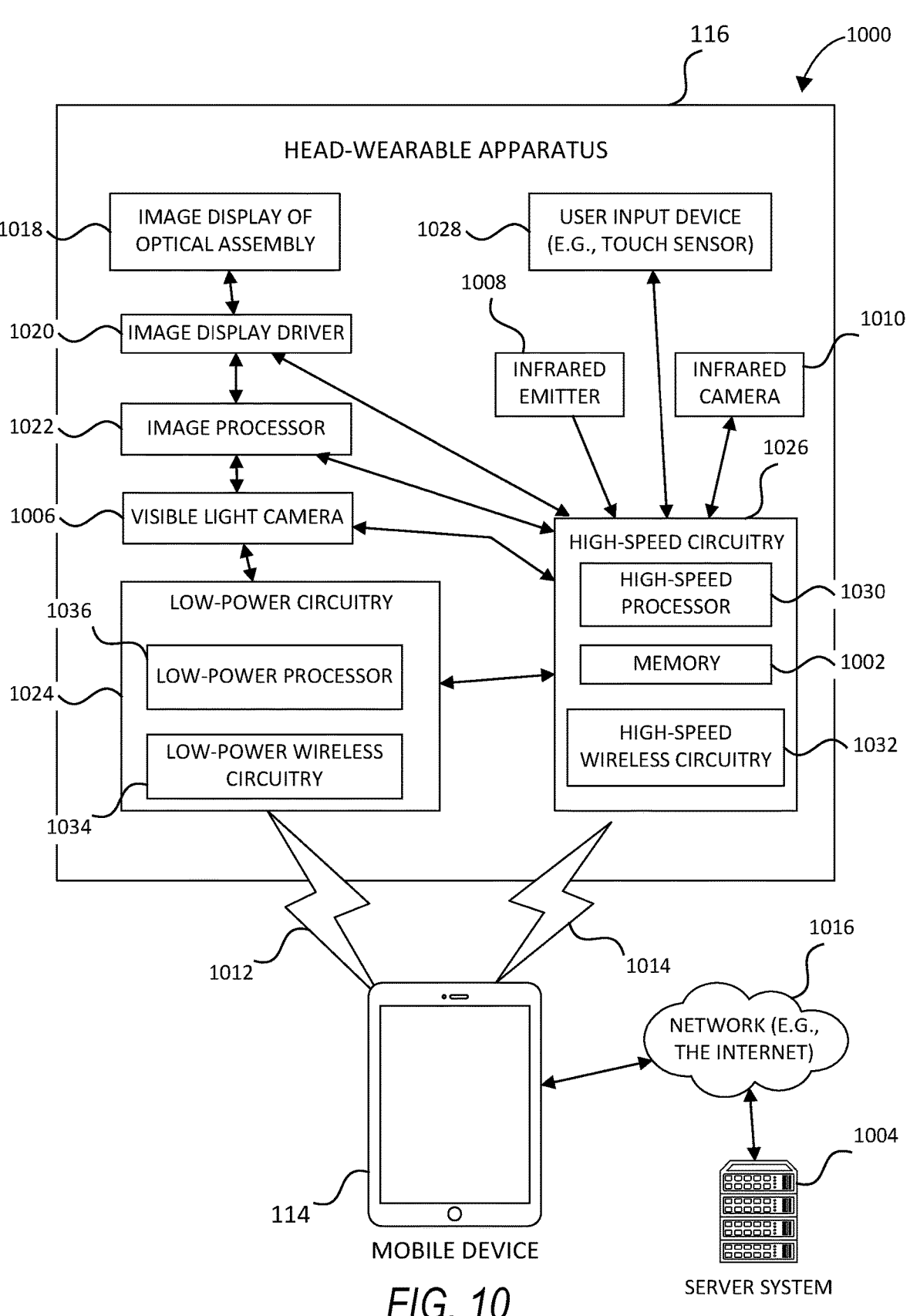
FIG. 10 illustrates a system in which a head-wearable apparatus may be implemented, according to some examples.

FIG. 10 illustrates a system 1000 including a head-wearable apparatus 116 with a selector input device, according to some examples. FIG. 10 is a high-level functional block diagram of an example head-wearable apparatus 116 communicatively coupled to a mobile device 114 and various server systems 1004 (e.g., the interaction server system 110) via various networks 1016.

The head-wearable apparatus 116 includes one or more cameras, each of which may be, for example, a visible light camera 1006, an infrared emitter 1008, and an infrared camera 1010.

The mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a GUI, to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as PNG, JPEG, Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the GUI of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include a storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WiFi. In some examples, other high-speed communications standards may be implemented by the high-speed wireless circuitry 1032.

Low-power wireless circuitry 1034 and the high-speed wireless circuitry 1032 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions for generating binaural audio content in the memory of mobile device 114 to implement the functionality described herein.

Output components of the head-wearable apparatus 116 include visual components, such as a display such as a LCD, a PDP, a LED display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or interaction on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multiprocessor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a CDMA connection, a GSM connection, or other types of cellular or wireless coupling. In this example, the coupling may implement any of a variety of types of data transfer technology, such as 1×RTT, EVDO technology, GPRS technology, EDGE technology, 3GPP including 3G, 4G networks, UMTS, HSPA, WiMAX, LTE standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by one or more processors, one or more images depicting a first person in a first pose;
receiving a source image depicting a target fashion item worn on a portion of a body of a second person in a second pose, the target fashion item comprising a plurality of parts of an individual garment worn on an individual body part of the second portion;
processing, using one or more machine learning models, the one or more images together with the source image to generate a set of data comprising a plurality of flow fields each associated with a different one of the plurality of parts of the individual garment worn on the individual body part of the second person, each of the plurality of flow fields indicating existence and location of each pixel of the one or more images in the source image, the set of data comprising source part masks and flow selection information;
sampling the source image using the plurality of flow fields to select one or more pixels from the source image to replace one or more target pixels in the one or more images, the sampling comprising:
selecting an individual pixel from a first flow field of the plurality of flow fields;
determining, based on the flow selection information, a first part of the plurality of parts that is associated with the individual pixel;
obtaining a first source part mask of the source part masks that corresponds to the first part; and
determining whether the individual pixel is included in the first source part mask, the one or more pixels being selected from the source image to replace the one or more target pixels in the one or more images based on determining whether the individual pixel is included in the first source part mask; and
modifying, based on the set of data generated by the one or more machine learning models, a portion of the one or more images to overlay the target fashion item on the first person in the first pose.

2. The method of claim 1, wherein the source part masks specify correspondence between the plurality of parts of the target fashion item and each pixel in the source image.

3. The method of claim 1, wherein the flow selection information specifies a correspondence between the plurality of parts of the target fashion item and each pixel in the one or more images.

4. The method of claim 1, further comprising:
in response to determining that the individual pixel is included in the first source part mask, replacing the individual pixel in the one or more images based on a corresponding pixel of the one or more pixels in the first source part mask.

5. The method of claim 1, wherein sampling the source image comprises:
selecting an additional individual pixel from the second flow field of the plurality of flow fields;
determining, based on the flow selection information, a second part of the plurality of parts that is associated with the additional individual pixel;
obtaining a second source part mask of the source part masks that corresponds to the second part; and
determining whether the additional individual pixel is included in the second source part mask, the one or more pixels being selected from the source image to replace the one or more target pixels in the one or more images based on determining whether the additional individual pixel is included in the second source part mask.

6. The method of claim 1, wherein the plurality of parts comprise upper arms, lower arms, left arm, right arm, and torso.

7. The method of claim 1, wherein the first flow field comprises a first image resolution, wherein the modified portion of the one or more images comprising the target fashion item comprises a second image resolution that is greater than the first image resolution.

8. The method of claim 7, wherein an image resolution of each of the plurality of flow fields is lower than the modified portion of the one or more images.

9. The method of claim 7, wherein the first image resolution is 33×33 pixels.

10. The method of claim 1, further comprising:

applying a pose estimation machine learning model to the one or more images to generate first pose estimation information representing the first pose of the first person; and applying the pose estimation machine learning model to the source image to generate second pose estimation information representing the second pose of the second person.

11. The method of claim 10, further comprising:

processing, by a flow estimation machine learning model, the first pose estimation information and the second pose estimation information, to generate the set of data.

12. The method of claim 1, further comprising:

sampling one or more pixels of the source image based on one of the flow fields to extract and adjust a pose of the target fashion item to match the first pose of the first person.

13. The method of claim 1, wherein the one or more machine learning models are trained by performing training operations comprising:

accessing training data comprising a first training image depicting a first training object in a first training pose, a second training image depicting a second training object in a second training pose, and a set of ground truth flow fields and a set of ground truth segmentation masks;

analyzing, using the one or more machine learning models, the first and second training images to estimate a first flow field for a first body part using a first ground truth segmentation mask of the set of ground truth segmentation masks corresponding to the first body part;

analyzing, using the one or more machine learning models, the first and second training images to estimate a second flow field for a second body part using a second ground truth segmentation mask of the set of ground truth segmentation masks corresponding to the second body part;

computing a loss based on a deviation between the estimated first and second flow fields for the first and second training images and the set of ground flow fields; and updating one or more parameters of the one or more machine learning models based on the computed loss.

14. The method of claim 13, further comprising generating the first and second training images by performing operations comprising:

accessing a first set of images depicting one or more objects;

accessing a second set of images depicting one or more fashion items;

generating the set of ground truth segmentation masks that segment individual parts of the one or more fashion items;

computing a first ground truth flow field indicating existence and location in the second set of images of a first part of the one or more objects depicted in the first set of images;

computing a second ground truth flow field indicating existence and location in the second set of images of a second part of the one or more objects depicted in the first set of images; and associating the first and second ground truth flow fields and the set of ground truth segmentation masks with the first and second sets of images.

15. A system comprising:

at least one processor; and at least one memory component having instructions stored thereon that, when executed by the at least one processor, cause the at least one processor to perform operations comprising:

receiving one or more images depicting a first person in a first pose;

receiving a source image depicting a target fashion item worn on a portion of a body of a second person in a second pose, the target fashion item comprising a plurality of parts of an individual garment worn on an individual body part of the second portion;

processing, using one or more machine learning models, the one or more images together with the source image to generate a set of data comprising a plurality of flow fields each associated with a different one of the plurality of parts of the individual garment worn on the individual body part of the second person, each of the plurality of flow fields indicating existence and location of each pixel of the one or more images in the source image, the set of data comprising source part masks and flow selection information;

sampling the source image using the plurality of flow fields to select one or more pixels from the source image to replace one or more target pixels in the one or more images, the sampling comprising:

selecting an individual pixel from a first flow field of the plurality of flow fields;

determining, based on the flow selection information, a first part of the plurality of parts that is associated with the individual pixel;

obtaining a first source part mask of the source part masks that corresponds to the first part; and determining whether the individual pixel is included in the first source part mask, the one or more pixels being selected from the source image to replace the one or more target pixels in the one or more images based on determining whether the individual pixel is included in the first source part mask; and modifying, based on the set of data generated by the one or more machine learning models, a portion of the one or more images to overlay the target fashion item on the first person in the first pose.

16. A non-transitory computer-readable storage medium having stored thereon instructions that, when executed by at least one processor, cause the at least one processor to perform operations comprising:

receiving one or more images depicting a first person in a first pose;

receiving a source image depicting a target fashion item worn on a portion of a body of a second person in a second pose, the target fashion item comprising a plurality of parts of an individual garment worn on an individual body part of the second portion;

processing, using one or more machine learning models, the one or more images together with the source image to generate a set of data comprising a plurality of flow fields each associated with a different one of the plurality of parts of the individual garment worn on the individual body part of the second person, each of the plurality of flow fields indicating existence and location of each pixel of the one or more images in the source image, the set of data comprising source part masks and flow selection information;

sampling the source image using the plurality of flow fields to select one or more pixels from the source image to replace one or more target pixels in the one or more images, the sampling comprising:

selecting an individual pixel from a first flow field of the plurality of flow fields;

determining, based on the flow selection information, a first part of the plurality of parts that is associated with the individual pixel;

obtaining a first source part mask of the source part masks that corresponds to the first part; and determining whether the individual pixel is included in the first source part mask, the one or more pixels being selected from the source image to replace the one or more target pixels in the one or more images based on determining whether the individual pixel is included in the first source part mask; and modifying, based on the set of data generated by the one or more machine learning models, a portion of the one or more images to overlay the target fashion item on the first person in the first pose.

17. The non-transitory computer-readable storage medium of claim 16, wherein the source part masks specify correspondence between the plurality of parts of the target fashion item and each pixel in the source image.

18. The non-transitory computer-readable storage medium of claim 16, wherein the flow selection information specifies a correspondence between the plurality of parts of the target fashion item and each pixel in the one or more images.

19. The non-transitory computer-readable storage medium of claim 16, wherein the plurality of parts comprise upper arms, lower arms, left arm, right arm, and torso.

20. The non-transitory computer-readable storage medium of claim 16, wherein the first flow field comprises a first image resolution, wherein the modified portion of the one or more images comprising the target fashion item comprises a second image resolution that is greater than the first image resolution.

* * * * *